United States Patent [19]

Kehr et al.

[11] 3,708,413

[45] Jan. 2, 1973

[54] HIGH ENERGY CURABLE LIQUID POLYENE-POLYTHIOL POLYMER COMPOSITION

[75] Inventors: Clifton L. Kehr, Silver Spring; Walter R. Wsolek, Sykesville, both of Md.

[73] Assignee: W. R. Grace & Co., New York, N.Y.

[22] Filed: June 23, 1970

[21] Appl. No.: 49,191

Related U.S. Application Data

[63] Continuation-in-part of Ser. No. 617,801, Feb. 23, 1967, abandoned, which is a continuation-in-part of Ser. No. 567,841, July 26, 1966, abandoned.

[52] U.S. Cl..........204/159.4, 117/93.31, 117/132 B, 117/132 R, 117/138.8 F, 117/148, 117/155, 204/159.15, 204/159.18, 204/159.23, 204/159.24, 260/2.5 A, 260/2.5 R, 260/7.4 R, 260/41 A, 260/41 B, 260/41 R, 260/41 AG, 260/63 OY, 260/77.5 BB, 260/77.5 CR, 260/77.5 MA, 260/77.5 AM, 260/79.5 B, 260/79.5 R, 260/79.5 NV, 260/858, 260/874

[51] Int. Cl...........C08d 1/00, C08f 1/16, C08c 11/54

[58] Field of Search ....260/77.5 MA, 77.5 AM, 79.7, 260/79.5 B, 79.5 R, 79.5 GR; 204/159.18, 159.14

[56] References Cited

UNITED STATES PATENTS

| 3,405,181 | 10/1968 | Gourdon | 260/79 |
|---|---|---|---|
| 3,278,352 | 10/1966 | Erickson | 260/79 |
| 3,371,072 | 2/1968 | Signouret et al. | 260/79 |
| 3,338,810 | 8/1967 | Warner | 260/79 |
| 3,412,049 | 11/1968 | Gmitter | 260/2.5 R |
| 2,921,006 | 1/1960 | Schmitz et al. | 204/159.15 |

*Primary Examiner*—Murray Tillman
*Assistant Examiner*—Richard B. Turer
*Attorney*—Eugene M. Bond and Kenneth E. Prince

[57] ABSTRACT

The invention disclosed is for a new high energy curable liquid polymer composition which includes a liquid polyene component having a molecule containing at least two unsaturated carbon-to-carbon bonds disposed at terminal positions on a main chain backbone of the molecule, and a polythiol component having a molecule containing a multiplicity of pendant or terminally positioned -SH functional groups per average molecule. The high energy curable liquid polymer composition upon curing in the presence of high energy irradiation forms odorless, solid, elastomeric products which may serve as sealants, coating, adhesives, and molded articles.

29 Claims, No Drawings

HIGH ENERGY CURABLE LIQUID POLYENE-POLYTHIOL POLYMER COMPOSITION

The present application for U.S. Letters Patent is a continuation-in-part of copending application Ser. No. 617,801, filed Feb. 23, 1967, now abandoned, which in turn is a continuation-in-part of application Ser. No. 567,841, filed July 26, 1966, now abandoned.

This invention relates to a new high energy curable liquid composition which includes a liquid polyene component having a molecule containing at least two unsaturated carbon-to-carbon bonds disposed at terminal positions on a main chain of the molecule, a polythiol component having a molecule containing a multiplicity of pendant or terminally positioned —SH functional groups per average molecule, and a photocuring rate accelerator.

It is well known in the art that cure of internally unsaturated polymers such as polybutadiene or polyisoprene may be effected with polythiols. However, such polymers, due mainly to residual internal unsaturation after curing, are unstable either to thermal oxidation or ultra-violet catalyzed oxidation, and are subject to rapid attack by ozone. Eventually degradation and embrittlement results in the internal double bond polymers, substantially reducing their useful service life.

A limitation of commercially available liquid polyurethane prepolymers is the fact that they are terminated by isocyanate (—NCO) groups. These —NCO groups are extremely unstable in storage, and are highly water-sensitive such that under practical conditions, they react with traces of moisture from the atmosphere to form gaseous carbon dioxide and amino groupings which in turn react with more —NCO to form eventually a highly viscous, sometimes completely insoluble urea-extended chain network. In cases where insolubilization occurs, the polymer has to be discarded at great expense. Further, if the —NCO—terminated prepolymers come in contact with traces of either acidic or basic impurities, dimerization and/or trimerization of the —NCO functions may take place to form viscous, sometimes insoluble products during storage. Even mild alkalis such as those constituents normally present on the surface of glass vessels and containers may cause storage problems.

A further limitation for some applications is found in polyurethane polymers of the prior art which are derived from aromatic diisocyanates or polyisocyanates such as tolylene-2,4-diisocyanate, tolylene-2,6-diisocyanate, 4,4'-diisocyanatodiphenylmethane, and the like. These aromatic diisocyanates (or mixtures thereof) enjoy widespread use in polyurethane elastomers, foams, and coatings, because of their ready commercial availability, high degree of reactivity and relatively low cost. The derived polyurethane products, however, are known to turn yellow, amber, orange or brown in color when exposed to sunlight, ultraviolet light or other forms of actinic radiation. This yellowing tendency imparts a definite limitation on the usage of such polyurethanes in many applications. There is evidence in the technical literature that shows that this yellowing or discoloration problem is directly attributable to the aromatic (benzeneoid) nucleus in the aromatic diisocyanates, and accordingly serious yellowing problems in polyurethanes may be avoided by use of aliphatic polyisocyanates such as hexamethylene diisocyanate. These aliphatic polyisocyanates, however, are difficult to manufacture, are relatively expensive and are relatively slow in reaction rate during polymer formation reactions in comparison to the aromatic polyisocyanates.

The use of polymeric liquid polythiol polymers which are cured to solid elastomeric products by oxidative coupling of the thiol (—SH) groups to disulfides (—S—S—groups) are known in the sealants, coatings and adhesives field. Oxidizing agents such as $PbO_2$ are commonly used to effect this curing reaction. These mercapto-containing compounds, however, both before and after curing with $PbO_2$—type curing system yield elastomeric compositions with an offensive odor which limits their usefulness generally to outdoor service. Thus, oxidatively-cured mercapto polymer systems have found restricted commercial acceptance due to their offensive odors.

A limitation of commercial liquid polymeric sealants and coatings is found in one-package systems. All the compounding ingredients, including the curing agents, are blended together and charged into a tightly sealed container until used. In these commercial sealants (polysulfides, polydisulfides, polymercaptans, polyurethanes and polysilicones), the curing reaction of one-package systems is initiated by moisture ($H_2O$) from the air. The moisture-curable systems leave something to be desired because the moisture content of the air varies widely. Hence, the curing performance of moisture-curable adhesives, coatings and sealants is variable and is difficult to predict and control. In the case of polyurethanes a further disadvantage of moisture-curable systems is observed. In the curing reaction (—NCO groups reacting with $H_2O$) a volatile gas (carbon dioxide) is liberated and this evolved gas tends to cause unsightly and property-weakening gas pockets or voids in the final product.

It has now been found that numerous defects of the prior art may be effectively overcome by practice of the present invention which provides a new high energy curable liquid composition which contains particular polyenes which are curable to solid resins or elastomers. For example, when urethane-containing polyenes are compounded with polythiols, the prepared composition may be stored safely for long periods of time in the absence of high energy bombardment. Upon exposure to high energy bombardment such as high energy electrons, the prepared system may be cured rapidly and controllably to a polythioether-polyurethane product which is low in cost and equal or better in reaction rate in polymer formation when compared with compositions derived from conventional technology.

Generally stated, the present invention provides a high energy curable composition which comprises a particular polyene component and a polythiol component.

The polyene component may be represented by the formula

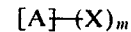

wherein m is an integer of at least 2, and X is a member selected from the group consisting of:

(a) 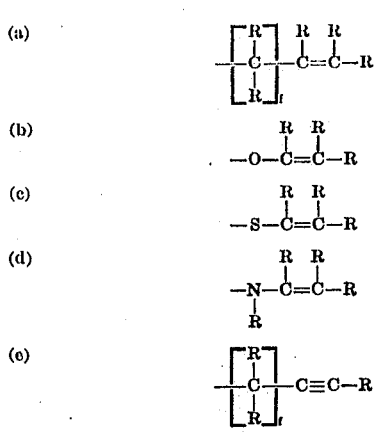

(b)

(c)

(d)

(e)

In the groups (a) to (e), f is an integer from 1 to 9; R is a radical selected from the group consisting of hydrogen, fluorine, chlorine, furyl, thienyl, pyridyl, phenyl and substituted phenyl, benzyl and substituted benzyl, alkyl and substituted alkyl, alkoxy and substituted alkoxy, and cycloalkyl and substituted cycloalkyl. The substituents on the substituted members are selected from the group consisting of nitro, chloro, fluoro, acetoxy, acetamido, phenyl, benzyl, alkyl, alkoxy and cycloalkyl. Alkyl and alkoxy have from one to nine carbon atoms and cyclo-alkyl has from three to eight carbon atoms.

The members (a) to (e) are connected to [A] through divalent chemically compatible derivative members. The members (a) to (e) may be connected to [A] through a divalent chemically compatible derivative member of the group consisting of $Si(R)_2$, carboxylate, sulfone, —O—,

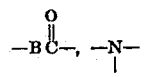

alkyl and substituted alkyl, cycloalkyl and substituted cycloalkyl, urethane and substituted urethane, urea and substituted urea, amide and substituted amide, amine and substituted amine, and aryl and substituted aryl. The alkyl members have from one to nine carbon atoms, the aryl members are either phenyl or naphthyl, and the cycloalkyl members have from three to eight carbon atoms with R and said members substituted being defined above. B is a member of the group consisting —O—, —S—, and —NR—.

The member [A] is polyvalent; free of reactive carbon-to-carbon unsaturation; free of highly water-sensitive members; and consisting of atoms selected from the group consisting of carbon, oxygen, nitrogen, chlorine, bromine hydrogen, fluorine, phosphorus and silicon.

The polyene component has a molecular weight in the range from about 64 to 20,000, preferably about 200 to about 10,000, and a viscosity in the range from essentially 0 to 20 million centipoises at 70° C. as measured by a Brookfield Viscometer.

The polythiol component has a molecular weight in the range from about 50 to about 20,000 and the general formula:

$$R_8 -(SH)_n$$

wherein $R_8$ is a polyvalent organic moiety free from reactive carbon-to-carbon unsaturation and $n$ is at least 2. The ene/thiol mole ratio is selected so as to provide a solid, self-supporting cured product under ambient conditions when exposed to high energy bombardment.

More particularly, the member [A] of the polyene composition may be formed primarily of alkyl radicals, phenyl and urethane derivatives, oxygenated radicals, and nitrogen substituted radicals. The member [A] may also be represented by the formula:

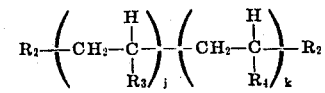

wherein $j$ and $k$ are integers greater than 1; $R_2$ is a member of the group consisting of hydrogen, and alkyl having one to nine carbon atoms; $R_3$ is a member of the group consisting of hydrogen, and saturated alkyl having one to nine carbon atoms; $R_4$ is a divalent derivative of the group consisting of phenyl, benzyl, alkyl, cycloalkyl, substituted phenyl, substituted benzyl, substituted alkyl and substituted cycloalkyl; with the terms alkyl, cycloalkyl and members substituted being defined above.

General representative formulas for the polyenes of the present invention may be prepared as exemplified below:

I — Poly (alkylene-ether) Polyol Reacted with Unsaturated Monoisocyanates Forming Polyurethane Polyenes and Related Polymers

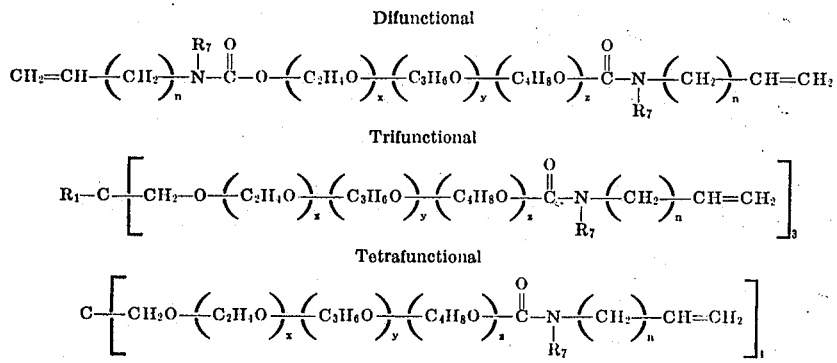

Tri-to-Hexafunctional

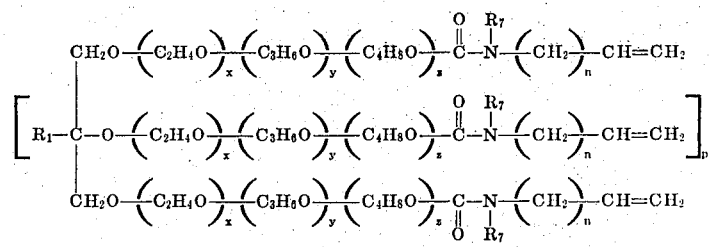

Interconnected-Modified Difunctional

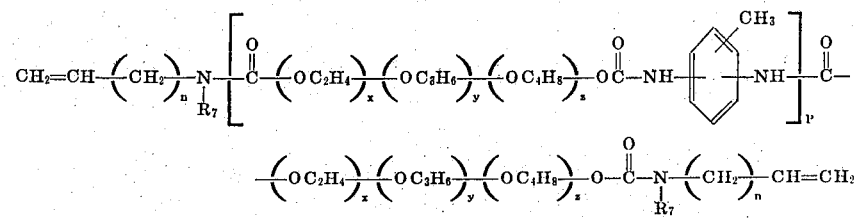

Interconnected-modified tetrafunctional

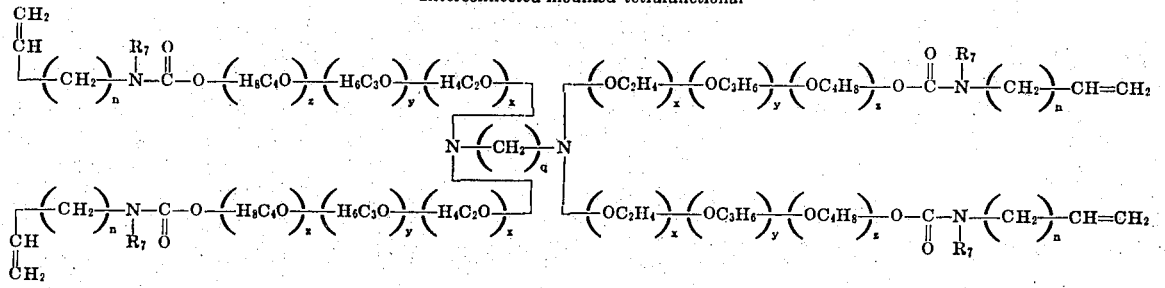

II — Poly (alkylene-ester) Polyol Reacted with
Unsaturated Monoisocyanates Forming Polyurethane
Polyenes and Related Polymers Difunctional

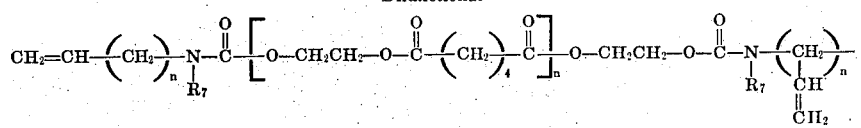

Interconnected-Modified Difunctional

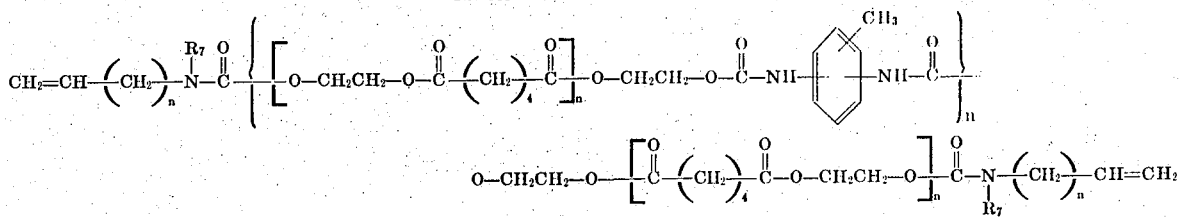

III — Poly (alkylene-ether) Polyol Reacted With
Polyisocyanate and Unsaturated Monoalcohol Forming
Polyurethane Polyenes and Related Polymers Difunctional

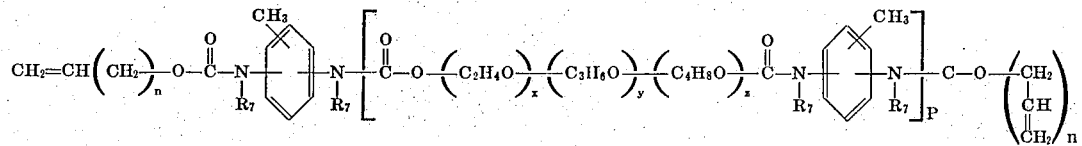

Trifunctional

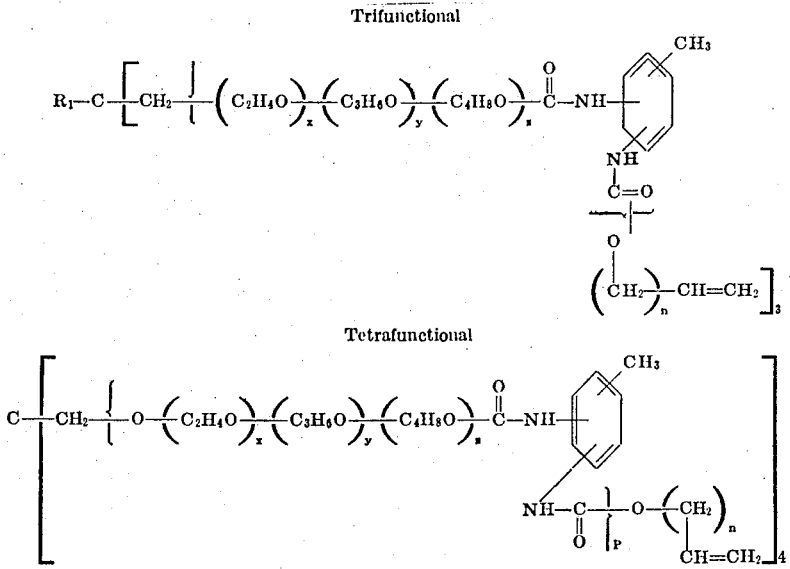

Tetrafunctional

In the above formulas, the sum of $x + y + z$ in each chain segment is at least 1; P is an integer of 1 or more; q is at least 2; n is at least 1; $R_1$ is selected from the group consisting of hydrogen, phenyl, benzyl, alkyl, cycloalkyl, and substituted phenyl; and $R_7$ is a member of the group consisting of $CH_2=CH-(CH_2)_n-$, hydrogen, phenyl, cycloalkyl, and alkyl.

The novel class of polyenes of this invention derived from carbon to carbon unsaturated monoisocyanates may be characterized by extreme ease and versatility of manufacture when the liquid functionality desired is greater than about three. For example, consider an attempted synthesis of a polyhexene starting with an —OH terminated polyalkylene ether hexol such as "-Niax" Hexol LS-490 (Union Carbide Corp.) having a molecular weight of approximately 700, and a viscosity of 18,720 cps at 20° C. An attempt to terminate this polymer with ene groups by reacting one mole of hexol with 6 moles of tolylene diisocyanate (mixed-2,4-, -2-6- isomer product) and 6 moles of allyl alcohol proceeded nicely but resulted in a prematurely chain extended and crosslinked solid product rather than an intended liquid polyhexene. Using the monoisocyanate route, however, this premature chain extension may be avoided and the desired polyurethane-containing liquid polyhexene may be very easily prepared by a simple, one-step reaction of one mole of hexol with 6 moles of allyl isocyanate. This latter polyhexene has the added advantage of being cured using the teachings of this invention to a non-yellowing polythioether polyurethane product. Similarly, the unsaturated monoisocyanate technique may be used to prepare liquid polyenes from other analagous highly functional polyols such as cellulose, polyvinyl alcohol, partially hydrolized polyvinyl acetate, and the like, and highly functional polyamines such as tetraethylene pentamine, polyethyleneimine, and the like.

A general method of forming one type of polyene containing urethane groups is to react a polyol of the general formula $R_{11}-(OH)_n$ wherein $R_{11}$ is a polyvalent organic moiety free from reactive carbon-to-carbon unsaturation and n is at least 2; with a polyisocyanate of the general formula $R_{12}-(NCO)_n$ wherein $R_{12}$ is a polyvalent organic moiety free from reactive carbon-to-carbon unsaturation and n is at least 2 and a member of the group consisting of an ene-ol, yne-ol, ene-amine and yne-amine. The reaction is carried out in an inert moisture-free atmosphere (nitrogen blanket) at atmospheric pressure at a temperature in the range from 0° to about 120° C for a period of about 5 minutes to about 25 hours. In the case where an ene-ol or yne-ol is employed, the reaction is preferably a one step reaction wherein all the reactants are charged together. In the case where an ene-amine or yne-amine is used, the reaction is preferably a two step reaction wherein the polyol and the polyisocyanate are reacted together and thereafter preferably at room temperature, the ene-amine or yne-amine is added to the NCO terminated polymer formed. The group consisting of ene-ol, yne-ol, ene-amine and yne-amine are usually added to the reaction in an amount such that there is one carbon-to-carbon unsaturation in the group member per hydroxyl group in the polyol and said polyol and group member are added in combination in a stoichiometric amount necessary to react with the isocyanate groups in the polyisocyanate.

A second general method of forming a polyene containing urethane groups (or urea groups) is to react a polyol (or polyamine) with an ene-isocyanate or an yne-isocyanate to form the corresponding polyene. The general procedure and stoichiometry of this synthesis route is similar to that described for polyisocyanates in the preceding. In this instance, a polyol reacts with an ene-isocyanate to form the corresponding polyene. It is found, however, that products derived from this route, when cured in the presence of high energy bombardment and a polythiol, may form relatively weak solid polythioether products. To obtain stronger cured products, it is desirable to provide polar functional groupings within the main chain backbone of the polymeric polyene. These polar functional groupings serve as connecting linkages between multiple repeating units in the main chain series, and serve as internal strength-reinforcing agents by virtue of their ability to create strong interchain attraction forces between molecules of polymer in the final cured composition.

Polyenes containing ester groups may be formed by reacting an acid of the formula $R_{13}-(COOH)_n$ wherein $R_{13}$ is a polyvalent organic moiety free from reactive carbon-to-carbon unsaturation and n is at least 2; with either an ene-ol or yne-ol. The reaction is carried out in an inert moisture-free atmosphere (nitrogen blanket) at atmospheric pressure at a temperature in the range from 0° to about 120° C. for a period of 5 minutes to 25 hours. Usually the reaction is carried out in the presence of a catalyst (p-toluene sulfonic acid) and in the presence of a solvent, e.g. benzene at refluxing temperature. The water formed is azeotroped off of the reaction.

Another method of making an ester containing polyene is to react a polyol of the formula $R_{11}$—(OH)$_n$ wherein $R_{11}$ is a polyvalent organic moiety free from reactive carbon-to-carbon unsaturation and $n$ is at least 2; with either an ene-acid or an yne-acid. The reaction is carried out in the same manner as set out above for the ester-containing polyenes. In practicing this latter technique, however, it may be found that ene-acids (or yne-acids) in which the ene (or yne) group is adjacent to an activating polar moiety such as

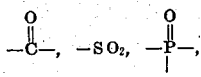

and the like are generally not desirable within the scope of this invention. These activated ene compounds are very prone to self-polymerization reactions to form vinyl polymers. Excessive amounts of self-polymerization of the ene groups is an undesirable side reaction in the present invention since the desired polythioether reaction products are precluded whenever self-polymerization of the ene groups occurs. Finally, the presence of activated, easily self-polymerizable ene groups in the composition leads to oxygen inhibition during curing, storage stability problems, or the need for excessively high inhibitor concentrations.

In forming the urethane-containing polyenes of the present invention, catalytic amounts of a catalyst may be employed to speed up the reaction. This is especially true in the case where an ene-ol is used to form the polyene. Such catalysts are well known to those in the art and include organometallic compounds such as stannous octoate, stannous oleate, dibutyl tin dilaurate, cobalt acetylacetonate, ferric acetylacetonate, lead naphthanate and dibutyl tin diacetate.

In summary, by admixing polyenes or polyynes containing two or more reactive unsaturated carbon-to-carbon bonds located terminal from the main chain with a polythiol containing two or more thiol groups per molecule and thereafter exposing said liquid mixture to high energy bombardment, there is provided an essentially odorless solid elastomeric or resinous polymeric product.

Polythiol as used herein refers to simple or complex organic compounds having a multiplicity of pendant or terminally positioned —SH functional groups per average molecule.

On the average the polythiol must contain 2 or more —SH groups/molecule and have a viscosity range of essentially 0 to 20 million centipoises (cps) at 70° C as measured by a Brookfield Viscometer either alone or when in the presence of an inert solvent, aqueous dispersion or plasticizer. Operable polythiols in the instant invention usually have molecular weights in the range about 50 to about 20,000, and preferably from about 100 to about 10,000.

The polythiols operable in the instant invention may be exemplified by the general formula $R_8$—(SH)$_n$ where $n$ is at least 2 and $R_8$ is a polyvalent organic moiety free from reactive carbon-to-carbon unsaturation. Thus $R_8$ may contain cyclic groupings and hetero atoms such as N, P or O and primarily contains carbon-carbon, carbon-hydrogen, carbon-oxygen, or silicon-oxygen containing chain linkages free of any reactive carbon-to-carbon unsaturation.

One class of polythiols operable with polyenes to obtain essentially odorless polythioether products are esters of thiol-containing acids of the formula HS—$R_9$—COOH where $R_9$ is an organic moiety containing no reactive carbon-to-carbon unsaturation with polyhydroxy compounds of structure $R_{10}$—(OH)$_n$ where $R_{10}$ is an organic moiety containing no reactive carbon-to-carbon unsaturation, and $n$ is 2 or greater. These components will react under suitable conditions to give a polythiol having the general structure:

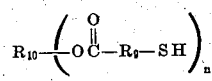

where $R_9$ and $R_{10}$ are organic moieties containing no reactive carbon-to-carbon unsaturation, and $n$ is 2 or greater.

Certain polythiols such as the aliphatic monomeric polythiols (ethane dithiol, hexamethylene dithiol, decamethylene dithiol, tolylene-2,4-dithiol, and the like, and some polymeric polythiols such as a thiol-terminated ethylcyclohexyl dimercaptan polymer, and the like, and similar polythiols which are conveniently and ordinarily synthesized on a commercial basis, although having obnoxious odors, are operable but many of the end products are not widely accepted from a practical, commercial point of view. Examples of the polythiol compounds preferred because of relatively low odor level include but are not limited to esters of thiogylcolic acid (HS—CH$_2$COOH), α-mercaptopropionic acid (HS—CH(CH$_3$)—COOH and β—mercaptopropionic acid (HS—CH$_2$CH$_2$COCH) with polyhydroxy compounds such as glycols, triols, tetraols, pentaols, hexaols, and the like. Specific examples of the preferred polythiols include but are not limited to ethylene glycol bis (thioglycolate), ethylene glycol bis (β—mercaptopropionate), trimethylolpropane tris (thioglycolate), trimethylolpropane tris (β—mercaptopropionate), pentaerythritol tetrakis (thioglycolate) and pentaerythritol tetrakis (β—mercaptopropionate), all of which are commercially available. A specific example of a preferred polymeric polythiol is polypropylene ether glycol bis (β—mercaptopropionate) which is prepared from polypropylene-ether glycol (e.g. Pluracol P 2010, Wyandotte Chemical Corp.) and β—mercaptopropionic acid by esterification.

The preferred polythiol compounds are characterized by a low level of mercaptan-like odor initially, and after reaction, give essentially odorless polythioether end products which are commercially attractive and practically useful resins or elastomers for both indoor and outdoor applications.

Prior to curing, the liquid polymer may be formulated for use as 100 percent solids, or disposed in organic solvents, or as dispersions or emulsions in aqueous media.

The curable liquid polymer compositions prior to curing may readily be pumped, poured, siphoned, brushed, sprayed, doctored, or otherwise handled as desired. Following application, curing in place to a solid resin or elastomer may be effected very rapidly as desired by manipulation of the compounding ingredients and the intensity of high energy curing.

The liquid polythioether-forming components and compositions, prior to curing, may be admixed with or blended with other monomeric and polymeric materials such as thermoplastic resins, elastomers or thermosetting resin monomeric or polymeric compositions. The resulting blend may be subjected to conditions for curing or co-curing of the various components of the blend to give cured products having unusual physical properties.

Although the mechanism of the curing reaction is not completely understood, it appears most likely that the curing reaction may be initiated by most any high energy generator which dissociates or abstracts a hydrogen atom from an SH group, or accomplishes the equivalent thereof. Generally the rate of the curing reaction may be increased by increasing the temperature of the composition at the time of initiation of cure. In many applications, however, the curing is accomplished conveniently and economically by operating at ordinary room temperature conditions. Thus for use in elastomeric sealants, it is possible merely to expose the polyene and polythiol admixtures to high energy bombardment under ambient conditions and obtain a cured solid elastomeric or resinous product.

The present composition may be cured by high energy bombardment such as by nuclear particles, as well as high energy radiation having a wavelength shorter than about 2,000 A.

A class of high energy bombardment includes energetic electrons such as those derived from isotopes such as strontium-90, or intense electron beams produced by particle accelerators. Electron beam curing is most useful in applications where very rapid and economical rates are desired. By way of example, in some systems curing periods of less than about one second may be experienced using a total radiation dose of less than about 0.25 megarads.

A second class of high energy bombardment includes x-rays. X-rays are useful in that relatively thick sections of curable composition may be penetrated during the curing process.

A third class of high energy bombardment includes energetic radiation derived primarily from radioactive isotopes, chemonuclear methods and the like. Included in this class are ionizing radiation particles such as alpha rays, neutrons, protons and the like as well as gamma radiation.

Conventional curing inhibitors or retarders which may be used in order to stabilize the components or curable compositions so as to prevent premature onset of curing may include hydroquinone; p-tert.-butyl catechol; 2,6-di tert.-butyl-p-methylphenol; phenothiazine; N-phenyl-2-naphthylamine; inert gas atmospheres such as helium, argon, nitrogen and carbon dioxide; vacuum, and the like.

To obtain the maximum strength, solvent resistance, creep resistance, heat resistance and freedom from tackiness, the reaction components consisting of the polyenes and polythiols of this invention are formulated in such a manner as to give solid, crosslinked, three dimensional network polythioether polymer systems on curing. In order to achieve such infinite network formation the individual polyenes and polythiols must have a functionality of at least 2 and the sum of the functionalities of the polyene and polythiol components must always be greater than 4. Blends and mixtures of the polyenes and the polythiols containing said functionality are also operable herein.

The compositions to be cured, i.e., (converted to solid resins or elastomers) in accord with the present invention may, if desired, include such additives as antioxidants, synergistic agents, dyes, inhibitors, fillers, pigments, anti-static agents, flame-retardant agents, thickeners, thixotropic agents, surface-active agents, viscosity modifiers, extending oils, plasticizers, tackifiers and the like within the scope of this invention. Such additives are usually preblended with the polyene or polythiol prior to or during the compounding step. Operable fillers include natural and synthetic resins, carbon black, glass fibers, wood flour, clay, silica, alumina, carbonates, oxides, hydroxides, silicates, glass flakes, glass beads, borates, phosphates, diatomaceous earth, talc, kaolin, barium sulfate, calcium sulfate, calcium carbonate, antimony oxide and the like. The aforesaid additives may be present in quantities up to 500 parts or more per 100 parts polymer by weight and preferably about 0.0005 to about 300 parts on the same basis.

The compounding of the components prior to curing may be carried out in several ways. For example, the polyene, the polythiol and any other inert additives may be admixed and charged to an aerosol can, drum, tube, or cartridge for subsequent use.

Another useful method of compounding is to prepare in an ambient atmosphere by conventional mixing techniques but in the absence of high energy bombardment, a composition consisting of polyene, antioxidant (to inhibit spontaneous oxygen-initiated curing), polythiol and other inert additives. This composition may be stored in the dark for extended periods of time, but on exposure to high energy bombardment will cure controllably and in a very short time period to solid polythioether products.

The mole ratio of ene/thiol for preparing the curable composition is from about 0.2/1 to about 5/1, and desirably about 0.75/1 to about 1.5/1.

The following examples will aid in explaining, but should not be deemed as limiting, the instant invention. In all cases, unless otherwise noted, all parts and percentages are by weight.

FORMATION OF POLYENE PREPOLYMER

Example 1

458 g. (0.23 moles) of a commercially available liquid polymeric diisocyanate sold under the tradename "Adiprene L-100" by E. I. duPont de Nemours & Co. was charged to a dry resin kettle maintained under a nitrogen atmosphere and equipped with a condenser, stirrer, thermometer, and gas inlet and outlet. 37.8 g. (0.65 moles) of allyl alcohol was charged to the kettle and the reaction was continued for 17 hours with stirring at 100° C. Thereafter the nitrogen atmosphere was removed and the kettle was evacuated 8 hours at 100° C. 50 cc. dry benzene was added to the kettle and the reaction product was azeotroped with benzene to remove the unreacted alcohol. This allyl terminated liquid prepolymer had a molecular weight of approximately 2100 and will be referred to as Prepolymer A hereinafter.

Example 2

400 g. (0.2 moles) of "Adiprene L-100" was charged to a dry resin kettle maintained under nitrogen and equipped with a condenser, stirrer, thermometer and gas inlet and outlet. 25.2 g. (0.43 moles) of propargyl alcohol (HC≡C—$CH_2OH$) was added to the kettle and the reaction was continued with stirring for 18 hours at 160° C. Thereafter the nitrogen atmosphere was removed and the kettle was evacuated 16 hours at 100° C followed by azeotropic distillations with 50 cc. water and then 50 cc. benzene to remove any excess propargyl alcohol. This HC≡C— terminated liquid prepolymer had a viscosity of 27,500 centipoises at 70° C and a molecular weight of 2100 and will be referred to as Prepolymer B hereinafter.

Example 3

1 mole of commercially available poly(ethylene ether) glycol having a molecular weight of 1450 and a specific gravity of 1.21 was charged to a resin kettle maintained under nitrogen and equipped with a condenser, stirrer, thermometer and a gas inlet and outlet. 2.9 g. dibutyl tin dilaurate as a catalyst was charged to the kettle along with 2 moles tolylene-2,4-diisocyanate and 2 moles of allyl alcohol. The reaction was continued with stirring at 60° C for 2 hours. Thereafter a vacuum of 1 mm. was applied for 2 hours at 60° C to remove the excess alcohol. This $CH_2$=CH— terminated prepolymer had a molecular weight of approximately 1950 and will hereinafter be referred to as Prepolymer C.

Example 4

1 mole of a commercially available poly(propylene ether) glycol having a molecular weight of about 1958 and a hydroxyl number of 57.6 was charged to a resin kettle equipped with a condenser, stirrer, thermometer and a gas inlet and outlet. 4 g. of dibutyl tin dilaurate as a catalyst was added to the kettle along with 348 g. (2.0 moles) of tolylene-2,4-diisocyanate and 116 g. (2 moles) of allyl alcohol. The reaction was carried out for 20 minutes at room temperature under nitrogen. Excess alcohol was stripped from the reaction kettle by vacuum over a 1 hour period. The thus formed $CH_2$=CH— terminated liquid prepolymer had a molecular weight of approximately 2400 and will hereinafter be referred to as Prepolymer D.

Example 5

750 g. of a N-containing tetrol (hydroxyl functionality = 4) available from Wyandotte Chemicals Corp. under the tradename "Tetronic Polyol 904" having a M.W. of 7,500 was placed in a reaction vessel heated at 110° C. The flask was maintained under vacuum for 1 hour. Then, under an atmosphere of nitrogen, 0.1 cc. dibutyl tin dilaurate was added and the flask was cooled to 50° C. Now 18.3 g. allyl isocyanate was added slowly, maintaining the temperature at about 95° C for about 1 hour after the addition was completed. The thus formed polymeric polyene (i.e., Prepolymer E hereinafter) had a theoretical allyl functionality of 2.2, a theoretical hydroxyl functionality of 1.8, and a calculated molecular weight of about 7,683.

Example 6

To a resin kettle maintained under a nitrogen atmosphere and equipped with a condenser, stirrer, thermometer and gas inlet and outlet was added 843 g. of a commercially available liquid diisocyanate prepolymer sold under the tradename "Multrathane F-196" by Mobay Chemical Co., said prepolymer having a molecular weight of about 1680 and an available isocyanate content of 4.7 – 5.2 percent. 87 g. (1.5 moles) of allyl alcohol was added to the kettle and the reaction was continued for 18 hours at 140° C with stirring. Thereafter the nitrogen atmosphere was removed and the kettle was evacuated for 22 hours at 100° C. 50 cc. of dry benzene was added to the kettle and the reaction product was azeotroped therewith to remove any unreacted alcohol. This $CH_2$=CH— terminated liquid prepolymer had a viscosity of 25,000 centipoises at 70° C and a molecular weight of approximately 1800 and will be referred to as Prepolymer F hereinafter.

Example 7

678 g. (0.34 moles) of a commercially available poly(propylene ether) glycol sold under the tradename NIAX by Union Carbide Co. and having a molecular weight of about 2025 was degassed for 2 hours at 100° C and thereafter charged to a resin kettle maintained under a nitrogen atmosphere and equipped with a condenser, stirrer, thermometer and gas inlet and outlet. 118 g. (0.68 moles) of tolylene 2,4-diisocyanate was charged to the kettle and the reaction was heated with stirring for 2 ¾ hours at 120° C. After cooling, 58 g. (1.0 moles) of allyl alcohol was added to the kettle and the mixture was refluxed at 120° C for 16 hours under nitrogen. Excess allyl alcohol was removed overnight by vacuum at 100° C. Half of the allyl terminated liquid prepolymer having a viscosity of 19,400 cps at 30° C as measured on a Brookfield Viscometer was removed from the kettle and will be referred to hereinafter as Prepolymer G. The other half portion of the prepolymer was combined with 50 cc. of dry benzene and azeotroped overnight following which excess benzene was pulled out under vacuum for 5 hours at 120° C. This portion of the allyl-terminated liquid prepolymer had a viscosity of 15,600 cps at 70° C as measured on a Brookfield Viscometer and a molecular weight of approximately 2500 and will hereinafter be referred to as Prepolymer H.

Example 8

751 g. (0.38 moles) of a commercially available poly(pro-pylene ether) glycol sold under the tradename "Pluracol P 2010" by Wyandotte Chemical Co. was degassed at room temperature for 3 hours and then charged to a dry resin kettle maintained under a nitrogen atmosphere and equipped with a condenser, stirrer, thermometer and gas inlet and outlet. 132 g. (0.76 moles) of tolylene-2,4-diisocyanate was charged to the kettle and the kettle was heated for 2 hours at 120° C with stirring under nitrogen. After cooling 58 g.

(1.0 moles) of allyl alcohol was added and the mixture was refluxed at 120° C overnight. Excess allyl alcohol was stripped by vacuum overnight at 120° C. The thus formed allyl terminated liquid prepolymer had a viscosity of 15,000 cps as measured on a Brookfield Viscometer at 70° C and a molecular weight of approximately 2500 and will hereinafter be referred to as Prepolymer I.

Example 9

To a 1 liter resin kettle equipped with stirrer, thermometer, gas inlet and outlet and heated to a temperature of 50° C was charged 610 g. (0.2 mole) of poly(tetramethylene ether) glycol, commercially available from Quaker Oats Co. and having a hydroxyl number of 37.1 along with 0.3 g. dibutyl tin dilaurate. The temperature of the kettle was raised to 110° C and the contents were freed of water under 1 millimeter vacuum for 1 hour. The resin kettle was cooled to 60° C and the system was placed under a protective atmosphere of nitrogen throughout the remainder of the reaction. 25.2 g. of allyl isocyanate, (0.4 mole) was added dropwise to the kettle at such a rate as to maintain the temperature at 60° C. When the NCO content dropped to 0.54 mg/g., 1 mm. vacuum again was applied and the system was heated at 70° C for one hour. The thus formed polymer product was a solid at room temperature but at 50° C is clear and pourable. The polymer product had a viscosity of 1,800 centipoises at 70° C as measured on a Brookfield Viscometer and an average molecular weight of approximately 3,200.

Example 10

To a 1 liter resin kettle equipped with stirrer, thermometer, gas inlet and outlet was charged 591 g. (0.30 mole) of a poly(propylene ether) glycol commercially available from Union Carbide under the tradename "PPG 2025" and 0.3 g. of dibutyl tin dilaurate. The kettle was heated to 110° C and the contents were freed of water under 1 mm. vacuum for 1 hour. The kettle was cooled to 25° C and the system was placed under a protective atmosphere of nitrogen throughout the remainder of the reaction. 53.1 ml. (49.8 g., 0.6 mole) of allyl isocyanate commercially available from Chemetron Corp. was added to the system. An exotherm carried the temperature to 45° C in 22 minutes. After 60 minutes, the NCO content (as determined by titration) was 0.04 mg/g. The system was placed under 1 mm. vacuum and heated to 70° C to remove traces of unreacted allyl isocyanate. The resultant polymer product had a viscosity of 600 centipoises at 30° C as measured on a Brookfield Viscometer and an average molecular weight of approximately 2,200.

The next two examples show a method of preparing the polyenes of the instant invention by dehydration of polyether glycols.

Example 11

100 g. of poly(propylene ether) glycol commercially available from Union Carbide under the tradename "PPG 2025" was poured through a hot tube filled with aluminum oxide at such a rate that the entire reaction took place in 2 hours. The tube was 1 inch in diameter with the reaction zone 1 ft. long and completely enclosed within a tube furnace. The alumina catalyst was 10–18 mesh and was maintained at 350° C using a Lindberg Hevi-Duty tube furnace. The tube was fitted with a dropping funnel and a nitrogen inlet at the top. Nitrogen pressure was kept on the system throughout the reaction. The product collected from the bottom of the tube was analyzed for unsaturation by the mercuric acetate titration method and was found to have 100 percent of the theoretical amount of unsaturation expected after dehydration of both terminal hydroxyl groups of the poly(propylene ether) glycol. The polyene product had a viscosity of 125 cps at 70° C and an average molecular weight of approximately 2,000.

Example 12

1 kilogram of poly(propylene ether) glycol commercially available from Union Carbide under the tradename "PPG 2025" was heated to 120° C in a round bottom flask. To this was added 120 ml. (20 percent excess) of acetic anhydride at such a rate that the temperature of the mixture was kept at 120°–140° C. Following the addition, the mixture was heated at 140° C for 4 hours. It was then cooled and diluted with an equal volume of chloroform, washed with 10 percent aqueous sodium carbonate, then with water. The organic layer was separated and the chloroform was removed by distillation. Infrared analysis of the purified material showed it to be the diacetate of the poly(propylene ether) glycol with no residual hydroxyl groups.

100 g. of this diacetate was put through the hot tube as in Example 11 except that the packing was glass helices instead of alumina and the temperature was 375° C. The product contained 64% of the theoretical amount of unsaturation expected after the elimination of acetic acid from both terminal acetoxy groups of the poly(propylene ether) glycol diacetate.

Example 13

114 g. of hexol sold under the tradename "NIAX Polyol LS-490" by Union Carbide Chemicals Co. having a molecular weight of 684 was charged to a 1 liter 4 neck flask and heated to 110° C under vacuum and nitrogen for 1 hour. It was then cooled to approximately 60° C whereat 0.1 cc. of dibutyl tin dilaurate was added followed by slowly adding 83 g. (1 mole) of allyl isocyanate to keep the temperature in the range 70°–80° C during the addition. After addition, the reaction was allowed to continue for 1 hour at 70° C. The polymeric hexaene product obtained had an average molecular weight of approximately 1200 and a viscosity of 300 centipoises at 70° C.

Example 14

To a 1 liter 4 neck flask was charged 300 milliliters of dimethylformamide, 35 g. of tolylene-2,4-diisocyanate and 0.1 cc. of dibutyl tin dilaurate. A mixture of 11.6 g. of allyl alcohol and 22.8 g. of hexol commercially available from Union Carbide Chemical Co. under the tradename "NIAX Polyol LS-490" having a molecular weight of 684 was slowly added to the flask. Temperature was kept at approximately 65°C during the addition and for a period of 1 hour. The polymeric product obtained had an average molecular weight of approximately 2,100.

Example 15

To a 1 liter 4 neck flask was charged 100 cc. of dimethylformamide, 100 g. of tolylene-2,4-diisocyanate and 0.1 cc. dibutyl tin dilaurate. 58 g. of hexol, i.e., "NIAX Polyol LS-490" by Union Carbide and 34 g. of allyl alcohol were mixed together and added dropwise to the flask. Before the addition to the flask was completed, the reaction, which was exothermic, jelled and the addition was discontinued.

A comparison of Examples 13, 14 and 15 shows that Example 13 is an improvement over Examples 14 and 15 in that it allows one to form polymer without the necessity of a solvent. A comparison of Examples 14 and 15 shows that when starting with a highly functional polyol using the diisocyanate/allyl alcohol technique one must operate in dilute solution to avoid premature crosslinking (i.e., gelation) which renders the polyene product useless as a curable liquid prepolymer. This problem is avoided completely by using the unsaturated monoisocyanate technique illustrated in Example 13.

Example 16

In a 1 liter, 4 neck flask 220 g. of hexol commercially available from Union Carbide Chemicals Co. under the tradename "NIAX Polyol LS-490" (0.32 moles) and 0.1 cc. of dibutyl tin dilaurate was heated to 110° C under vacuum for 1 hour. After cooling in nitrogen to approximately 60° C, 80 g. of allyl isocyanate was added to the flask by means of a dropping funnel. The exothermic reaction produced a temperature of 100° C. When the addition was complete the reaction was continued at 70° C for 1 hour. The resulting triene polymer product had an average molecular weight of approximately 950 and a viscosity of 300 centipoises as measured on a Brookfield Viscometer at 70° C.

Example 17

To a 1 liter 4 neck flask was charged 300 g. of a polyester diol (molecular weight 3232) sold under the tradename "RC Polyester S 101-35" by R. C. Division, Hooker Chemical Corp. and 0.1 cc. of dibutyl tin dilaurate. The flask was heated to 110° C of dibutyl tin dilaurate. The flask was heated to 110° C under vacuum and maintained thereat for 1 hour. The flask was cooled to approximately 60° C, nitrogen was admitted, and 7.7 g. allyl isocyanate and 8.1 g. of tolylene-2,4-diisocyanate was added by means of a dropping funnel to the reaction at a moderate rate. A maximum temperature of 90° C was needed. When the addition was complete the reaction was allowed to continue at 70° C for 1 hour. The thus formed solid polymeric product had an average molecular weight of approximately 6,800 and a viscosity of 13,600 centipoises when measured on a Brookfield Viscometer at 70° C.

Example 18

To a 1 liter 4 neck flask heated at 110° C was charged 808 g. of a polyester diol (having a molecular weight 3232) sold under the tradename "RC Polyester S 101-35" by R. C. Division Hooker Chemical Corp. and 0.1 cc. dibutyl tin dilaurate. The flask was maintained under vacuum at 110° C for 1 hour. The flask was cooled to approximately 50° C and with nitrogen passing through, a mixture of 10 g. of allyl alcohol and 60 g. of tolylene-2,4-diisocyanate was added via a dropping funnel at a moderate rate. The reaction was allowed to continue for 15 minutes. A maximum temperature of 90° C was produced by the exothermic reaction. The polymeric product obtained was a solid at room temperature but liquid at 70° C. The product had an average molecular weight of approximately 10,500 and a viscosity of 270,000 centipoises at 70° C.

Example 19

Following the procedure of Example 12 and using necessary reactants, a polyene of the following formula was prepared:

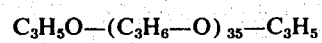

$$C_3H_5O-(C_3H_6-O)_{35}-C_3H_5$$

Example 20

Following the procedure of Example 3, and using necessary reactants, a polyene of the following formula was prepared:

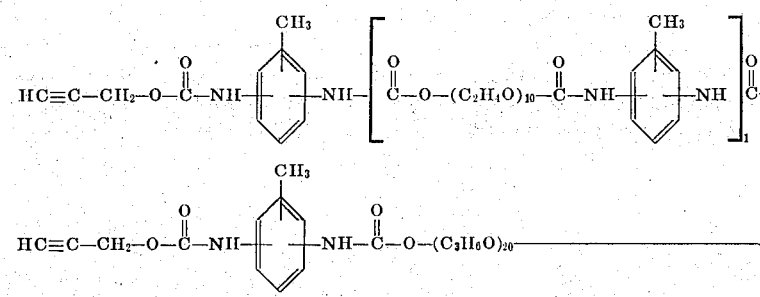

Example 21

A crotyl-terminated polyurethane which contains two reactive double bonds per average molecule in a near terminal position was prepared following the general procedure of Example 3. The resulting polymeric polyene was found to have the following formula:

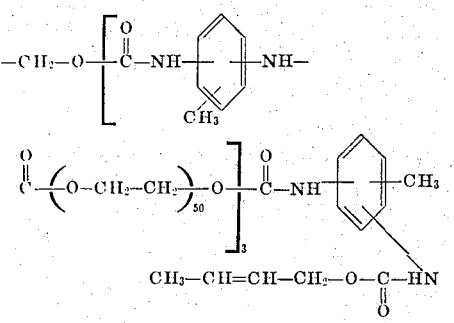

Example 22

Following the procedure of Example 3, and using necessary reactants, a polyene of the following formula was prepared:

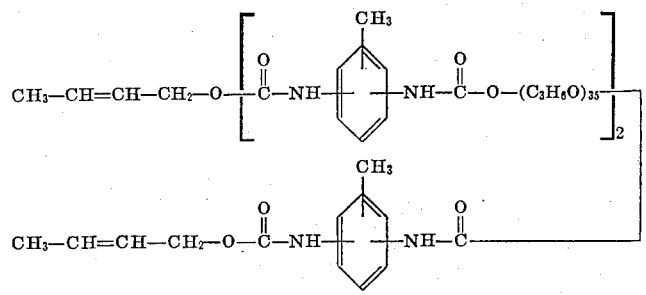

Example 23

Following the procedure of Example 3, and using necessary reactants, a polyene of the following formula was prepared:

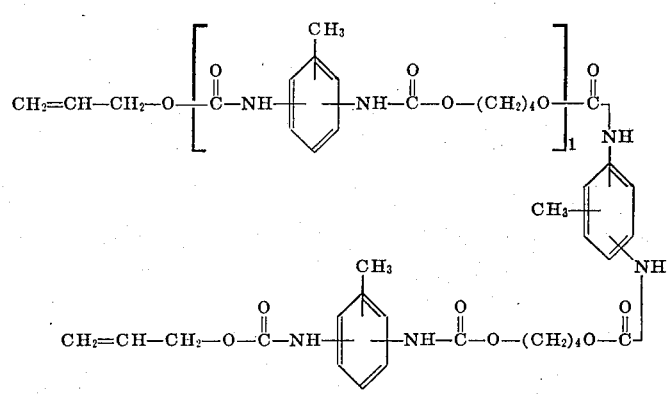

EXAMPLES 24–42

Following the general procedure of the prior examples, and using the necessary reactants, a series of polyenes having the formula:

$$X-(B-A)_n-B-X$$

where $n$ is 1 or greater were prepared wherein the derivative members forming the polyenes are defined in the following:

| Ex. No. | Component [A] | Component [B] | Component [X] |
|---|---|---|---|
| 24 | CH₂Br<br>HO—CH₂C—CH₂—OH<br>CH₂Br<br>Dibromoneopentyl glycol, DOW SA-1138, 3 moles. | CH₃ / —NCO / NCO (ring)<br>2,6-/2,4-tolylene diisocyanate blend, 4 moles. | Cl<br>CH₂=C—CH₂OH<br>2-chloro-2-propenol-1, 2 moles. |
| 25 | CH₂Br<br>HO—CH₂C—CH₂OH<br>CH₂Br<br>Dibromoneopentyl glycol, DOW SA-1138, 5 moles. | CH₃ / NCO / NCO (ring)<br>2,6-/2,4-tolylene diisocyanate blend, 6 moles. | CH₂=CHOCH₂CH₂OH<br>2-vinyloxyethanol, 2 moles. |
| 26 | CH₂Br<br>HO—CH₂—C—CH₂OH<br>CH₂Br<br>Dibromoneopentyl glycol, DOW SA-1138, 40 moles. | OCNCH₂CH₂CH₂CH₂CH₂CH₂NCO<br>Hexamethylene diisocyanate, 41 moles. | (phenyl ring)<br>CH≡C—CHOH<br>1-phenyl-2-propynol-1, 2 moles. |
| 27 | CH₃<br>HO—CH—CH₂  CH₃<br>  \\N—CH₂CH₂N / CH₂CHON<br>HO—CHCH₂       CH₂CH—OH<br>CH₃             CH₃<br>N,N,N¹,N¹-tetrakis(2-hydroxypropyl)ethylene diamine, Wyandotte, Quadrol, 2 moles. | CH₂—NCO<br>(ring)<br>CH₂NCO<br>1,3-xylylene diisocyanate, 7 moles. | CH₃<br>H₂ —CH₂OH<br>H₂  H₂<br>H₂<br>1-methyl-2-methylolcyclohexene, 6 moles. |

EXAMPLES – Continued

| Ex. No. | Component [A] | Component [B] | Component [X] |
|---|---|---|---|
| 28 | N,N,N¹,N¹-tetrakis(2-hydroxypropyl) ethylene diamine, Wyandotte, Quadrol, 2 moles. | OCNCH₂CH₂CH₂CH₂CH₂CH₂NCO — Hexamethylene diisocyanate, 7 moles. | CH₂=CHS—CH₂CH₂OH — Vinyl hydroxyethyl sulfide, 6 moles. |
| 29 | N,N,N¹,N¹-tetrakis(2-hydroxypropyl) ethylenediamine, Wyandotte Quadrol, 2 moles. | 2,4-tolylene diisocyanate, 7 moles. | Di(3-benzylallyl amine, 6 moles. |
| 30 | Phosphorous based Polyol Pluracol® 208 Polyol, Wyandotte Chem. Corp., 2 moles. | Methylene bis(4-phenyl isocyanate), 3 moles. | 1,1,1-trimethylolpropanediallyl ether, 2 moles. |
| 31 | HO—(CH₂CH₂CH₂CH₂O)₁₄—H — Polymeg® from Quaker Oats Co., 2 moles. | Methylene bis(4-cyclohexyl isocyanate), 3 moles. | HO—CH₂—(CH₂)₈—CH=CH₂ — Omega-undecylenyl alcohol. |
| 32 | HO—C(O)—CF₂CF₂—C(O)—OH — Tetrafluorosuccinic acid, 10 moles. | Diphenylsilanediol, 9 moles. | N-methyl-N-vinyl ethanolamine, 2 moles. |
| 33 | 1,2-cyclohexanediol, 5 moles. | 1,5-naphthalene diisocyanate, 6 moles. | 2-(2-pyridyl)-allyl alcohol. |
| 34 | HO—CH₂CH(CH₃)—OH — Propylene glycol, 6 moles. | Isophthalic acid, 5 moles. | OCN—CH₂—CH=CH—(phenyl) — 3-phenylallyl isocyanate, 2 moles. |
| 35 | Diphenylsilanediol, 6 moles. | Methylene bis-(4-cyclohexylisocyanate), 5 moles. | OCN—CH₂—C(CH₃)=CH₂ — 2-methyl-allyl isocyanate, 2 moles. |

EXAMPLES — Continued

| Ex. No. | Component [A] | Component [B] | Component [X] |
|---|---|---|---|
| 36 | $H_2N-(CH_2CH_2NH)_{30}-CH_2CH_2NH_2$<br>Poly(ethylene imine), 1 mole. | None. | $OCN-(CH_2)_8-CH=CH_2$<br>9-decenyl isocyanate, 3 moles. |
| 37 | $HO-CH_2-\underset{\underset{CH_2Br}{\mid}}{\overset{\overset{CH_2Br}{\mid}}{C}}-CH_2-OH$<br>Dibromoneopentyl glycol, DOW SA-1138, 3 moles. | $OCN-(CH_2)_6-NCO$<br>Hexamethylene diisocyanate, 4 moles. | $HO-CH_2-\underset{\underset{Cl}{\mid}}{C}=CH_2$<br>2-chloro-2-propen-1-ol, 2 moles. |
| 38 | $H_2N-CH_2-\langle S \rangle-CH_2NH_2$<br>1,4-di(aminomethyl)cyclohexane, 10 moles. | $HOOC-(CH_2)_4-COOH$<br>Adipic acid, 11 moles. | $H_2N-CH_2-C(=CH_2)-CH_2-C_6H_4-OCH_3$<br>2-(p-methoxybenzyl) allyl amine, 2 moles. |
| 39 | $HO-CF_2CF_2-OH$<br>Tetrafluoroethylene glycol, 3 moles. | Trimellitic anhydride (COOH, phthalic anhydride ring), 1 mole. | $HO-CH_2-C_6H_4-O-CH=CH_2$<br>4-vinyloxybenzyl alcohol, 3 moles. |
| 40 | $HO-(CH_2CH_2O)_{230}-H$<br>Poly(ethylene ether) glycol, 1 mole. | None. | $OCN-(CH_2)_3-CH=CH_2$<br>4-pentenylisocyanate, 2 moles. |
| 41 | Pluracol® 208, phosphorus-based polyol, Wyandotte Chem. Co., 1 mole. | DDI® diisocyanate dimer acid-based diisocyanate, General Mills Co., 2 moles. | $HO-CH_2-\underset{\underset{CH_2OCH_2CH=CH_2}{\mid}}{\overset{\overset{CH_2OCH_2CH=CH_2}{\mid}}{C}}-C_2H_5$<br>1,1,1-trimethylolpropanediallyl ether, 2 moles. |
| 42 | $\begin{array}{c}HO-CH(CH_3)-CH_2\\HO-CH(CH_3)-CH_2\end{array}N-CH_2CH_2-N\begin{array}{c}CH_2CH(CH_3)-OH\\CH_2CH(CH_3)-OH\end{array}$<br>N,N,N',N'-tetrakis(2-hydroxypropyl)ethylene diamine, Wyandotte Co., Quadrol®, 1 mole. | $OCN-CH(CH_3)-(CH_2)_4-CH_2-NCO$<br>2,7-di(isocyanato)heptane, 4 moles. | N-(2-furyl)-N-vinyl ethanolamine, 4 moles. |

HIGH ENERGY CURING PROCESS

Examples 43–47

20 grams of an admixture of Prepolymer I polyene (Example 8), pentaerythritol tetrakis(β-mercaptopropionate), a commercially available polythiol from Carlisle Chemical Company sold under the trade name "Q-43," said admixture being in the ene:thiol mole ratio of 1/1, respectively, were placed in a shallow aluminum dish to a depth of about 250 mils. The dish containing the sample was placed on a conveyor belt at ambient temperature, under an atmosphere of $N_2$ and passed under the electron beam of a 2 m.e.v. electron accelerator manufactured by High Voltage Engineering Co. of Burlington, Mass. The conveyor belt was adjusted to travel at a rate of 18.3 inches/minute, which gives a 3-second exposure to the electron beam. The total dosage up to 1 Mrad was controlled by adjusting the beam current. Above 1 Mrad total dosage, the number of passes was increased until the desired dosage was obtained. The results are shown below:

High Energy Radiation Curing Results ($N_2$ Atmosphere)

| Example No. | Total exposure time, sec. | Total radiation dosage Mrads | Shore A hardness |
|---|---|---|---|
| 43 | 3 | 0.10 | 20* |
| 44 | 3 | 0.65 | 30 |
| 45 | 3 | 1.0 | 38 |
| 46 | 9 | 3.0 | 36 |
| 47 | 15 | 5.0 | 40 |

*Bottom surface was tacky.

The above results show that curing was accomplished completely through the sample thickness within 3 seconds at a total dosage of 0.65 Mrad, and through most of the sample at a dosage of only 0.1 Mrad. This is equivalent to a conversion rate from liquid to solid product of more than 5,000 mils/minute. After removal from the aluminum molds, the products were placed in a Fade-O-Meter (UV light) for 48 hours. After exposure, the samples were essentially unchanged except for a noticeable yellowing in color.

Example 48

Example 43 was repeated except that the polyene used was the hexaene from Example 13. The sample was cured completely through the entire thickness at the 0.1 Mrad total dosage. This sample remained entirely colorless after 48 hours exposure to UV light in the Fade-O-Meter.

Examples 49–52

Examples 43–46 were repeated except that the electron beam irradiation curing was carried out in an atmosphere of air. The results were for all practical purposes the same as those observed in the inert nitrogen atmosphere.

Examples 53–56

Example 46 was repeated except that curing was done in air and polyene Prepolymer I was replaced by an equivalent amount of each of the following polyenes: Prepolymer B, Prepolymer C, Prepolymer E, and Prepolymer A. Each of the products was cured to solid products under the conditions used.

Examples 57–58

Example 46 was repeated except that the samples were cured in air, the polythiol was trimethylolpropane tris(thioglycolate), the polyene was the structure from Example 30, and the ene/thiol mole ratio was 0.75/1.0 and 1.4/1.0, respectively.

Example 59

Example 45 was repeated except that the samples were irradiated in air and the polythiol was an equimolar mixture of pentaerythritol tetrakis (thioglycolate) and ethylene glycol bis(3-mercaptopropionate). The samples cured to a solid under the conditions used.

Examples 60–67

Example 44 was repeated except that the curing was done in air and the polyene was each of the following: glycerol trioleate; diallyl phthalate; diallyl amine; diallyl adipate; polyene from Examples 24, 36, 38, 39. Similar results were experienced.

Example 68

1.5 moles of β-mercaptopropionic acid, 0.5 moles of a commercially available poly(propylene ether) glycol sold under the tradename "Pluracol P-2010" by Wyandotte Chemical Corp. and 0.1 g. p-toluenesulfonic acid and 50 ml. benzene were charged to a resin kettle maintained under a nitrogen atmosphere and equipped with a condenser, stirrer, thermometer and gas inlet and outlet. The mixture was heated and the benzene-water azeotrope was collected. The actual amount of water collected amounted to 17.5 g. The reaction was vacuum-stripped for several hours at 70° C to remove benzene. The resulting polythiol polymer had a molecular weight of about 2,210–2,230 and an average functionality of 2 and was collected for use herein.

659 g. (0.145 moles of a poly(propylene ether) triol commercially available from Wyandotte Chemical Corp. under the tradename "Pluracol TPE 4542" having a molecular weight of about 4500 and a hydroxyl number of 37.1, and 0.3 g. of dibutyl tin dilaurate were charged to a resin kettle maintained under a nitrogen atmosphere and equipped with a condenser, stirrer, thermometer and gas inlet and outlet. The reactants were maintained at 110° C for 1 hour and then cooled under nitrogen to room temperature. 25.2 g. (0.435 moles) of allyl alcohol was added to the kettle followed by 75.7 g. (0.435 moles) of an 80–20 percent isomer mixture of tolylene-2,4-diisocyanate and tolylene 2,6-diisocyanate respectively sold under the tradename "Mondur TD 80." The temperature reached 55° C in 6 minutes. A sample was titrated for NCO resulting in 6.02 mg. NCO/g. after 20 minutes. After 1 hour the NCO titration showed 0.997 mg. NCO/g. The polyene polymer had a molecular weight of about 5200 and an average functionality of 3 and was vacuum stripped at 70° C for 1 hour and then collected. 0.003 mole of the polythiol polymeric material formed supra was charged to a 2 oz. glass jar along with 0.002 mole of the allyl-terminated polyene polymer formed herein along with 0.085 gram of Irganox 1076 (a phenolic antioxidant sold commercially by Geigy Chemical Co.), 1.7 grams of $TiO_2$ pigment and 1.7 grams of Emtal Talc (available from Eastern Magnesia Talc Co., Burlington, Vt.). The resulting composition was thoroughly mixed by stirring, and was then exposed to electron bombardment under the conditions of Example 59. The composition was cured to a solid product.

Example 69

10 grams of Prepolymer E from Example 5 were added to each of three 2 oz. jars. To one of the jars was added 3 ml. of benzene containing 0.5% based on the weight of the prepolymer of an antioxidant sold under the trade name "Santonox" commercially available from Monsanto Chemical Co. To another of the jars containing Prepolymer E was added 3 ml. of benzene containing 0.5 percent based on the weight of the prepolymer of an antioxidant sold under the trade name "Dalpac FG" commercially available from Hercules Powder Co. To the third jar was added 3 ml. of benzene as a control. To blend the components the jars were heated in a force draft oven set at 150° C for 25 minutes with frequent stirring. The jars were withdrawn from the oven and 1.3 grams of trimethylolpropane tris(β-mercaptopropionate) were added to each of the jars and curing was initiated indoors under ambient conditions. The control run, without any antioxidant present, cured within ½ hour to a solid elastomeric polymer product. The example containing "Dalpac FG" cured to a solid polymer product after 12 days whereas the sample containing "Santonox" required more than 2 weeks before a solid self-supporting cured polymeric product resulted.

The polyenes used in the instant invention may be used as blends or mixtures of monoenes or polyenes having the same or different functionalities so long as the average functionality of the blend or mixture is at least 2. Similarly, the polythiols used herein may be used as blends or mixtures of monothiols or polythiols having the same or different functionalities as long as the average functionality of the blend or mixture is at least 2.

The polyene/polythiol mole ratio is selected so as to provide a solid final cured product, i.e., one that is non-flowing and structurally self-supporting under ambient conditions. In typical cases, as shown by the examples, this ratio can be about 0.2 to 5 moles thiol groups per mole ene groups. In general, the more ratios significantly above or below 1 tend to give a high proportion of chain extension or grafting whereas mole ratios near 1 give predominantly chain extension and crosslinking. Occasionally, however, ratios necessary to give a solid as aforesaid may lie outside the stated range, and experimentation may be necessary to determine a suitable ratio to give a solid. This experimentation is easily carried out and offers no difficulties to those skilled in the art.

The following examples show the use of the novel thiol ethers as adhesives, coatings, sealants and molded objects.

Example 70

The following formulations were made up:

| Ingredients | Formulation No. I (parts) | Formulation No. II (parts) |
|---|---|---|
| Prepolymer D from Example 4 | 100 | 100 |
| TiO$_2$ (pigment) | 4 | 4 |
| Unimal 507 (kaolin clay) | 60 | 85 |
| Unimal 303 (kaolin clay) | 25 | 0 |
| Thickening agent (75% silica gel-25% asbestos fibers) | 4 | 4 |
| Pentaerythritol tetrakis (mercaptopropionate) | 10 | 10 |

The above formulations were briefly admixed for homo-geneity and thereafter high energy cured by the conditions of Example 59. Both samples cure to a solid, tack-free elastomeric sealant under the conditions used.

Example 71

10 grams of Prepolymer D were charged to a 2 oz. glass jar along with 0.7 gram of ethylene glycol bis(mercaptopropionate and 2.2 grams pentaerythritol tetrakis(mercaptopropionate). The reactants were well mixed and then placed between two pieces of aluminum foil, each of 5 mil thickness. The aluminum foil was pressed together by hand to insure good contact, and then passed under the electron beam using the conditions of Example 59. An attempt was made to pull the aluminum foil apart. The aluminum foil tore before the adhesive bond was destroyed.

Example 72

50 grams of Prepolymer H along with 5.0 grams of pentaerythritol tetrakis(mercaptopropionate) were stirred together briefly in a glass jar and then poured into an aluminum mold in the shape of a shallow dish. The mold and contents were exposed to the electron beam under the conditions of Example 59, after which time the mold was torn away from the molded article which had set to a solid in the exact shape of the mold.

Example 73

0.005 mole of Prepolymer E from Example 5 was charged to a 2 oz. glass jar along with 0.0033 mole of trimethylolpropane tris($\beta$-mercaptopropionate). The reactants were stirred briefly and then coated onto a piece of 17 pt. clay coated paper by means of a No. 10 rod. The coated paper was then placed under the electron beam under the conditions of Example 59. A clear solid coating resulted on the paper. The same technique was used successfully to coat cellophane, aluminum foil, steel plate stock, "Mylar" polyester film, plywood, and a concrete block of the type used in building construction.

EXAMPLES 74–88

| Sample number | Polyene | Source of polyene | Poly-thiol* | Electron** beam (EB) dosage, megarads | Shore A hardness, EB cured |
|---|---|---|---|---|---|
| 74 | 1,2,4-trivinylcyclohexane | Aldrich Chem. Co., Inc. | Q–43 | 0.50 | 83 |
| 75 | 1,5-hexadiene | do | Q–43 | 2.00 | 58 |
| 76 | Diallyl terephthalate | Chemicals Procurement Lab., Inc. | Q–43 | 0.50 | 78 |
| 77 | Diallyl oxalate | Monomer-Polymer Labs., Inc. | Q–43 | 0.50 | 80 |
| 78 | Diallyl 1,4-cyclohexanedicarboxylate | do | Q–43 | 0.50 | 70 |
| 79 | Tetraallyl orthosilicate | Aldrich Chem. Co., Inc. | Q–43 | 0.25 | 72 |
| 80 | Diallyl diphenylsilane | Chemicals Procurement Lab., Inc. | Q–43 | 0.25 | 75 |
| 81 | Diallyl allyl phosphonate | Aldrich Chem. Co., Inc. | Q–43 | 0.25 | 88 |
| 82 | Diallyl phenyl phosphite | K. & K. Laboratories, Inc. | Q–43 | 0.50 | 60 |
| 83 | N,N-diallylformamide | Aldrich Chem. Co., Inc. | Q–43 | 0.25 | 53 |
| 84 | N,N,N',N'-tetrallylmethylenediamine | Monomer-Polymer Labs., Inc. | Q–43 | 0.50 | 70 |
| 85 | 4-vinyl-1-cyclohexene | K. & K. Laboratories, Inc. | Q–43 | 2.5 | 60 |
| 86 | Diethyleneglycol divinyl ether (.9 mole), diallyl amine (.1 mole) | Polysciences, Inc. | Q–43 | | >20 |
| 87 | Triallyl phosphate | Aldrich Chemical Co., Inc. | P–33 | | >20 |
| 88 | N,N-diallyl piperazine | Chemicals Procurement Lab., Inc. | Q–43 | | >20 |

*Q–43 is pentaerythritol tetrakis ($\beta$-mercaptopropionate); P–33 is trimethylolpropane tris ($\beta$-mercaptopropionate). The polythiol is used in the theoretical equivalent amount based on the polyene used.
**Samples were irradiated using a Van de Graaff accelerator. Sample thickness 35–140 mils.

Example 89

916 grams (0.46 mole) of a commercially available liquid polymeric diisocyanate sold under the trade name "Adiprene L-100" by E. I. duPont de Nemours & Co. were charged to a dry flask maintained under a nitrogen atmosphere and equipped with a condenser, stirrer, thermometer and gas inlet and outlet. 197 grams (0.92 mole) of the diallyl ether of trimethylolpropane were charged to the vessel along with 0.56 gram dibutyltin dilaurate catalyst. The flask and contents were heated with stirring for 30 minutes at 50° C to yield a polytetraene of about 2,400 M.W.

To the tetraene were added 230 grams pentaerythritol tetrakis($\beta$-mercaptopropionate), 18.4 grams benzophenone, 1.2 grams dilaurylthiodipropionate, 136 grams of dioctyl phthalate, and 1.2 grams Plastanox 2246 (hindered phenol antioxidant sold by American Cyanamid Co.). This photocurable liquid composition was cast on a glass plate in a layer 40 mils thick. It was then exposed to high energy curing according to the conditions of Example 43. The layer cured to a solid through the entire thickness under the conditions used, or at a liquid-to-solid conversion rate of over 800 mils/minute. The solid rubbery product had a Shore A hardness of 70, a tensile strength of 200 psi, and an elongation at failure of about 30 percent.

Example 90

An 80/20 mixture of tolylene 2,4-diisocyanate and tolylene 2,6-diisocyanate (1 mole) was reacted with allyl alcohol (2 moles) under the conditions used for the similar synthesis described in Example 89. The resulting diene (3 moles) was mixed with 2.1 moles of the tris(3mercaptopropyl) ether of tris(2-hydroxyethyl) isocyanurate.

10 grams of the above curable composition were placed in a small aluminum mold and inserted into the exposure chamber of a Model M 38-3 Gammator B laboratory irradiator (available from Radiation Machinery Inc.) fitted with Cesium 137 - Chloride as the radiation source, furnishing a nominal 0.15 megarad/hour radiation intensity of gamma radiation. After 1 hour exposure, the liquid composition was cured to a crosslinked solid having a Shore A hardness greater than 20.

Example 91

The tetraene (1 mole) from Example 41 was admixed with pentaerythritol tetrakis($\beta$-mercaptopropionate) (1.2 moles). A 5 gram sample of this composition was exposed to x-radiation in the GE XRD-3 (air path) radiation unit. The unit was equipped with a tungsten target tube and operated at 50 KV and 40 milliamps. The composition layer cured through the entire ¼ inch depth within 10 minutes, or at a liquid-to-solid conversion rate in excess of 25 mils/minute. The Shore A hardness of the solid cured product was in excess of 50 units.

The solid cured polythioether polymer products resulting from the instant invention have many and varied uses. Examples of some uses include but are not limited to adhesives; caulks; elastomeric sealants; coatings; encapsulating or potting compounds; liquid castable elastomers; thermoset resins; impregnants for fabric, cloth, fibrous webs and other porous substrates; laminating adhesives and coatings; mastics; glazing compounds; fiberglass reinforced composites; sizing or surface finishing agents; filleting compounds; cure in place gasketing compounds; rocket fuel binders; foamable thermosetting resins or elastomers; molded articles such as gaskets, diaphragms, balloons, automobile tires, etc.

The molecular weight of the polyenes of the present invention may be measured by various conventional methods, including solution viscosity, osmotic pressure and gel permeation chromatography. Additionally, the molecular weight may be calculated from he known molecular weight of the reactants.

The viscosity of the polyenes and polythiols may be measured on a Brookfield Viscometer at 30° or 70° C in accord with the instructions therefor.

The components to be cured may be prepared as either single-packaged or multi-packaged liquid polymer systems which may be cured to solid polythioether elastomers without liberating gaseous by-products which cause bubbles and voids in the vulcanizate. Thus, there is provided curable liquid polymer systems composed of polyenes and polythiols in which the components individually are storage stable and which are not sensitive to or deteriorated by traces of moisture or oxygen containing gas such as may be encountered during normal storage or handling procedures. Solid resinous or elastomeric products may be prepared from flowable liquids in a system in which the rate of curing may be inhibited or retarded by the use of chemical inhibitors, antioxidants, inert atmospheres and the like. The cured product may be characterized as in the thermally and oxidatively stable state since there is no reactive carbon-to-carbon unsaturation in the main backbone chain.

As used herein the term polyene and the term polyne refers to single or complex species of alkenes or alkynes having a multiplicity of terminal reactive carbon-to-carbon unsaturated functional groups per average molecule. For example, a diene is a polyene that has two reactive carbon-to-carbon double bonds per average molecule, while a diyne is a polyyne that contains in its structure two reactive carbon-to-carbon triple bonds per average molecule. Combinations of reactive double bonds and reactive triple bonds within the same molecule are also possible such as for monovinylacetylene which is a polyeneyne under this definition. For purposes of brevity all these classes of compounds are referred to hereafter as polyenes.

In defining the position of the reactive functional carbon-to-carbon unsaturation, the term terminal is intended to mean that functional unsaturation is at an end of the main chain in the molecule; whereas by near terminal is intended to mean that the functional unsaturation is not more than 10 carbon atoms and typically less than eight carbon atoms from an end of the main chain in the molecule. The term pendant means that the reactive carbon-to-carbon unsaturation is located terminal or near-terminal in a branch of the main chain as contrasted to a position at or near the ends of the main chain. For purposes of brevity all of these positions are referred to herein generally as terminal unsaturation.

Functionality as used herein refers to the average number of ene or thiol groups per molecule in the polyene or polythiol, respectively. For example a triene is polyene with an average of three reactive carbon-to-carbon unsaturated groups per molecule and thus has a functionality ($f$) of three. A dithiol is a polythiol with an average of two thiol groups per molecule and thus has a functionality ($f$) of two.

It is to be understood that the functionality of the polyene and the polythiol component is commonly expressed in whole numbers although in practice the actual functionality may be fractional. For example, a polyene component having a nominal functionality of 2 (from theoretical considerations alone) may in fact have an effective functionality of somewhat less than 2. In an attempted synthesis of a diene from a glycol in which the reaction proceeds to 100 percent of the theoretical value for complete reaction, the functionality (assuming 100% pure starting materials) would be 2.0. If however, the reaction were carried to only 90 percent of theory for complete reaction, about 10% of the molecules present would have only one ene functional group, and there may be a trace of material that would have no ene functional groups at all. Approximately 90 percent of the molecules, however, would have the desired diene structure and the product as a whole then would have an actual functionality of 1.9. Such a product is useful in the instant invention and is referred to herein as having a functionality of 2.

The term reactive unsaturated carbon-to-carbon groups means groups which will react under proper conditions as set forth herein with thiol groups to yield the thioether linkage

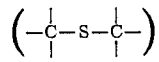

as contrasted to the term unreactive carbon-to-carbon unsaturation which means

groups found in aromatic nucleii (cyclic structures exemplified by benzene, pyridine, anthracene, and the like) which do not under the same conditions react with thiols to give thioether linkages.

Highly water-sensitive groups are intended to include, for example, isocyanate, acylhalide such as acylchloride, anhydride and the like which readily react with water, alcohols, ammonia, amines and the like.

Odorless has been used herein to mean the substantial absence of the well-known offensive and sometimes obnoxious odors that are characteristic of hydrogen sulfide and the derivative family of compounds known as mercaptans.

The term non-yellowing means the substantial resistance during prolonged exposure to actinic radiation such as exposure in sunlight, to unsightly or uncontrollable discoloration.

It is understood that the foregoing detailed description is given merely by way of illustration and that many variations may be made therein without departing from the spirit of this invention.

What is claimed is:

1. A high energy curable composition useful for obtaining an essentially odorless, solid polythioether, said curable composition consisting essentially of:

A. a terminally unsaturated polyene component which comprises the formula:

$$[A]\!-\!(X)_m$$

wherein $m$ is an integer of at least 2, wherein X is

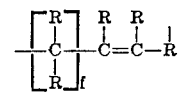

where $f$ is an integer from 1 to 9; R is a radical selected from the group consisting of hydrogen, fluorine, chlorine, furyl, thienyl, pyridyl, phenyl and substituted phenyl, benzyl and substituted benzyl, alkyl and substituted alkyl, alkoxy and substituted alkoxy, cycloalkyl and substituted cycloalkyl; said substituents on said substituted members selected from the group consisting of nitro, chloro, fluoro, acetoxy, acetamide, phenyl, benzyl, alkyl, alkoxy and cycloalkyl; said alkyl and alkoxy having from one to nine carbon atoms and said cycloalkyl having from three to eight carbon atoms;

wherein [A] is free of reactive carbon-to-carbon unsaturation; free of highly water-sensitive members; and is a polyvalent chemically compatible member of the group consisting of carbonate, carboxylate, carbonyl, ether, silane, silicate, phosphonate, phosphite, phosphate, alkyl and substituted alkyl, cycloalkyl and substitute cycloalkyl, aryl and substituted aryl, urethane and substituted urethane, urea and substituted urea, amine and substituted amine, amide and substituted amide, hydroxyl, heterocyclic carbon containing radical, and mixtures thereof; said substituents on said members being defined above, said component having a molecular weight in the range from about 64 to 20,000; and a viscosity in the range from essentially 0 to 20 million centipoises at 70° C.;

B. a polythiol component having a molecular weight in the range from about 50 to about 20,000 of the general formula:

$$R_8\!-\!(SH)_n$$

wherein $R_8$ is a polyvalent organic moiety free from reactive carbon-to-carbon unsaturation and $n$ is at least 2, the sum of $m$ and $n$ being greater than 4, with the polyene/polythiol mole ratio being selected so as to provide a solid, self-supporting cured product in the presence of high energy bombardment selected from the group consisting of high energy radiation having a wavelength shorter than about 2,000 A, and nuclear particles.

2. The composition of claim 1 wherein [A] has the formula:

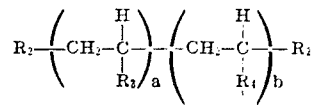

wherein $a$ and $b$ are integers greater than 1;

$R_2$ is a member of the group consisting of hydrogen and alkyl;

$R_3$ is a member of the group consisting of hydrogen, and saturated alkyl;

$R_4$ is a divalent derivative of the group consisting of phenyl, benzyl, alkyl, cycloalkyl, substituted phenyl, substituted benzyl, substituted alkyl and substituted cycloalkyl, said alkyl, cycloalkyl and substituents on members substituted being defined as in claim 1.

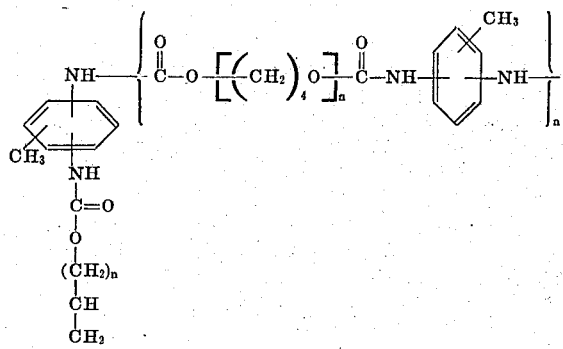

3. The composition of claim 1 wherein the polyene has the formula:

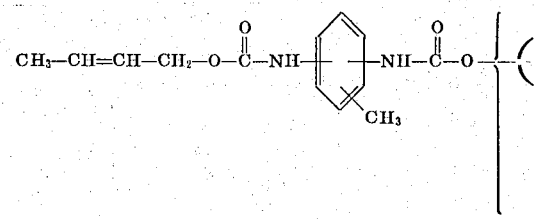

wherein n is at least 1; and $R_7$ is a member of the group consisting of $CH_2\!=\!CH\!\!-\!\!(CH_2)_n$, hydrogen, phenyl, cycloalkyl and alkyl;

said substituent on member which is substituted, the cyclo-alkyl, and the alkyl defined as in claim 1.

4. The composition of claim 1 wherein the polyene has the formula:

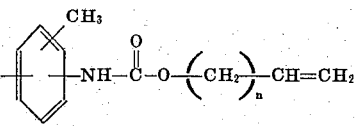

wherein $n$ is at least 1; and $R_7$ is a member of the group consisting of $CH_2\!=\!CH\!\!-\!\!(CH_2)_n$, hydrogen, phenyl, cycloalkyl and alkyl;

said substituent on member which is substituted, the cyclo-alkyl, and the alkyl defined as in claim 1.

5. The composition of claim 1 wherein the polyene has the formula:

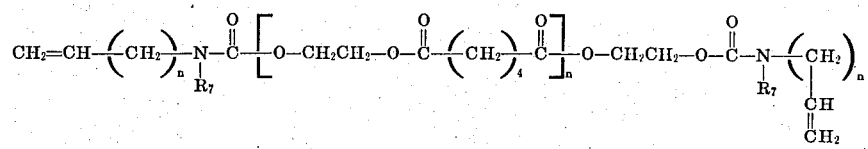

where $n$ is at least 1.

6. The composition of claim 1 wherein the polyene has the formula:

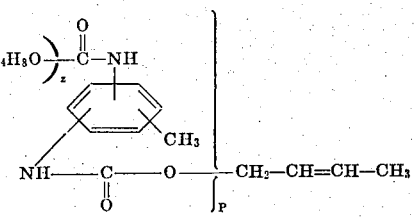

wherein the sum of $x + y + z$ is at least 1; $n$ is at least 1, and P is at least 2.

7. The composition of claim 1 wherein the polyene has the formula:

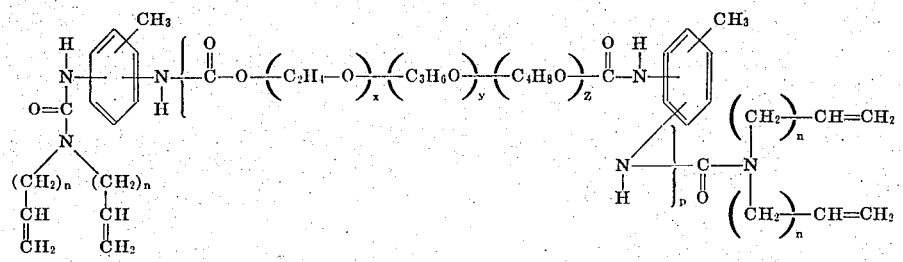
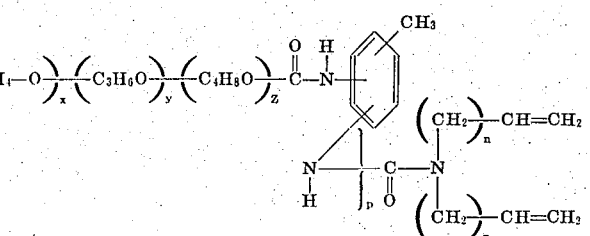

wherein the sum of $x + y + z$ is at least 1; $n$ is at least 1; and P is at least 2.

8. The composition of claim 1 wherein the polyene has the formula:

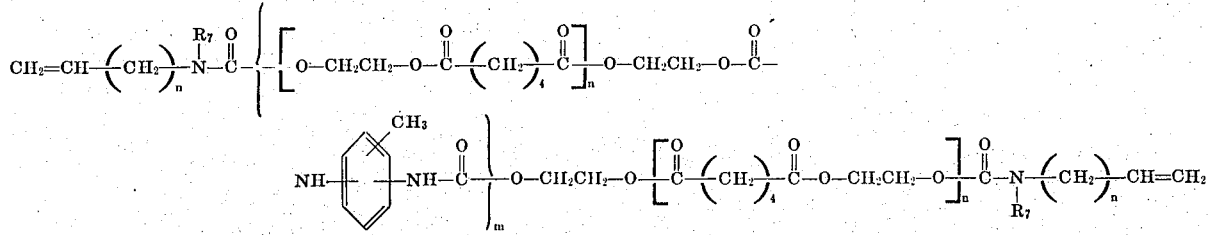

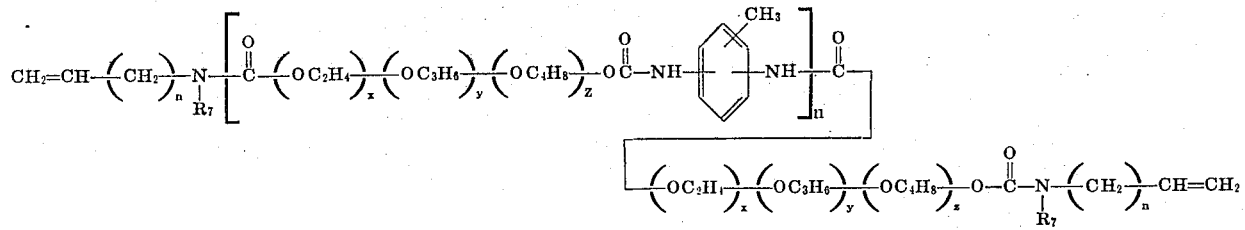

wherein the sum of $x + y + z$ in each chain segment is at least 1;

$n$ is at least 1; and $R_7$ is a member of the group consisting of $CH_2=CH-$

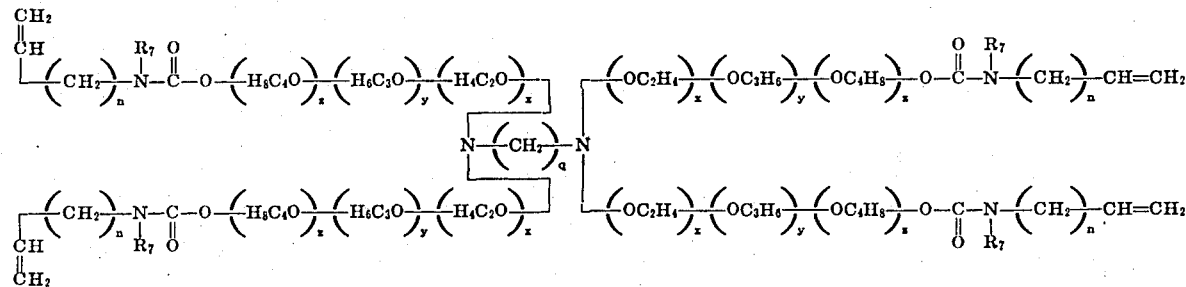

$CH_2-_n$, hydrogen, phenyl, cycloalkyl, and alkyl; said substituent on member which is substituted, the cycloalkyl, and the alkyl defined as in claim 1.

9. The composition of claim 1 wherein the polyene has the formula:

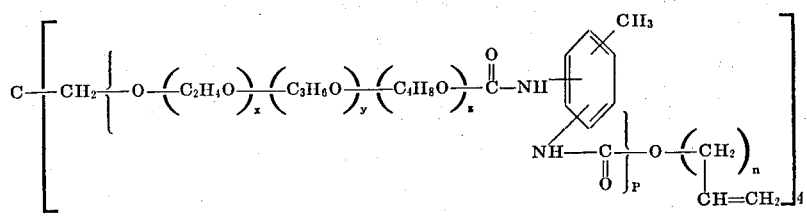

wherein the sum of $x + y + z$ in each chain segment is at least 1; $n$ is at least 1, and P is at least 2.

10. The composition of claim 1 wherein the polyene has the formula:

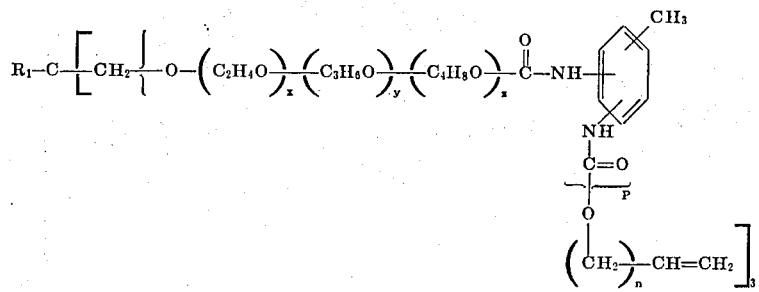

wherein the sum of $x + y + z$ in each chain segment is at least 1;

$n$ is at least 1; and P is at least 2.

$R_1$ is selected from the group consisting of hydrogen, phenyl, benzyl, alkyl, cycloalkyl, and substituted phenyl;

said substituent on member which is substituted, the cycloalkyl and the alkyl defined as in claim 1.

11. The composition of claim 1 wherein the polyene has the formula:

(formula continued above)

wherein $q$ is at least 2; the sum of $x + y + z$ in each chain segment is at least 1; $n$ is at least 1; and $R_7$ is a member of the group consisting of $CH_2=CH\text{-}($ $CH_2\text{-})_n$, hydrogen, phenyl, cycloalkyl and alkyl; said substituent on member which is substituted, the cycloalkyl and the alkyl defined as in claim 1.

12. The composition of claim 1 wherein the polyene has the formula:

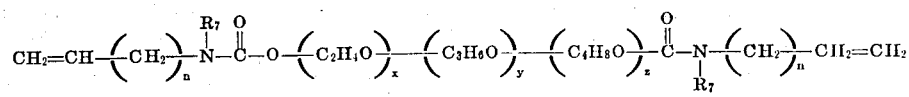

wherein the sum of $x + y + z$ is at least 1;

$n$ is at least 1; and $R_7$ is a member of the group consisting of $CH_2=CH$ $-(CH_2\text{-})_n$, hydrogen, alkyl, phenyl, and cycloalkyl said alkyl and cycloalkyl defined as in claim 1.

13. The composition of claim 1 wherein the polyene has the formula:

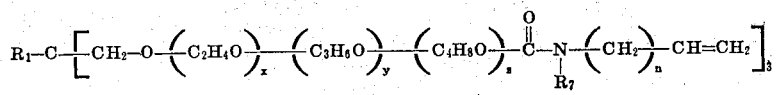

wherein the sum of $x + y + z$ in each chain segment is at least 1; $n$ is at least 1;

$R_1$ is selected from the group consisting of hydrogen, phenyl, benzyl, alkyl, cycloalkyl, and substituted phenyl; and $R_7$ is a member of the group consisting of $CH_2{=}CH{-}(CH_{2n}{-})$, hydrogen, alkyl, phenyl, and cycloalkyl;
said member which is substituted, the cycloalkyl and the alkyl defined as in claim 1.

14. The composition of claim 1 wherein the polyene has the formula:

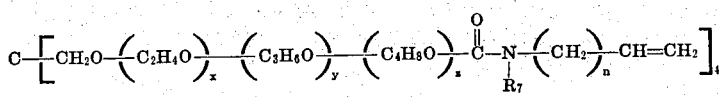

wherein the sum of $x + y + z$ in each chain segment is at least 1; $n$ is at least 1;

$R_7$ is a member of the group consisting of $CH_2{=}CH{-}(CH_2{-})_n$, hydrogen, phenyl, cycloalkyl and alkyl;
said member which is substituted, the cycloalkyl and the alkyl defined as in claim 1.

15. The composition of claim 1 wherein the polyene has the formula:

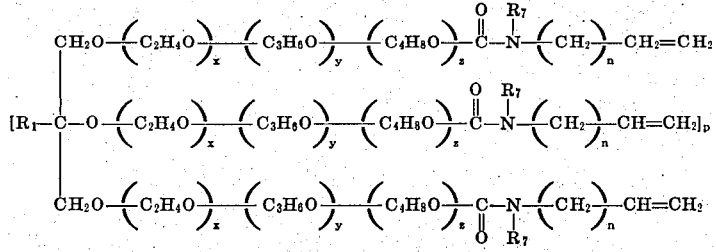

wherein the sum of $x + y + z$ in each chain segment is at least 1;

$p$ is an integer from 1 to 4; $n$ is at least 1;

$R_1$ is selected from the group consisting of hydrogen, phenyl, benzyl, alkyl, cycloalkyl, and substituted phenyl;

$R_7$ is a member of the group consisting of $CH_2{=}CH{-}(CH_2{-})_n$, hydrogen, phenyl, cycloalkyl, and alkyl;
said member which is substituted, the cycloalkyl, and the alkyl defined as in claim 1.

16. The composition of claim 1 wherein the polyene has the formula:

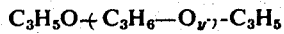

wherein $y$ is at least 1.

17. The composition of claim 1 wherein the mole ratio of polyene to polythiol is from about 0.5/1 to about 2/1.

18. The composition of claim 1 wherein the mole ratio of polyene to polythiol is from about 0.75/1 to about 1.5/1.

19. A high energy curable composition useful for obtaining an essentially odorless, solid polythioether, said curable composition consisting essentially of:

A. a terminally unsaturated polyene component having the formula:

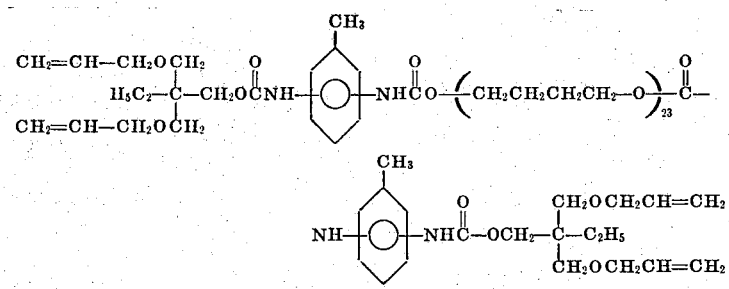

said polyene having a functionality of 4;

B. a polythiol component, said polythiol being pentaerythritol tetrakis (β- mercaptopropionate), the said polythiol having a functionality of 4, the sum of the polyene and polythiol functionalities being 8, the polyene/polythiol mole ratio being selected so as to provide a solid, self-supporting cured product in the presence of high energy bombardment selected from the group consisting of high energy radiation having a wavelength shorter than about 2,000 Å, and nuclear particles.

20. A process of forming essentially odorless solid polythioether which comprises I. Admixing:

A. a terminally unsaturated polyene component which comprises the formula:

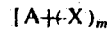

wherein m is an integer of at least 2; wherein X is

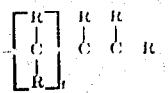

where $f$ is an integer from 1 to 9; R is a radical selected from the group consisting of hydrogen, fluorine, chlorine, furyl, thienyl, pyridyl, phenyl and substituted phenyl, benzyl and substituted benzyl, alkyl and substituted alkyl, alkoxy and substituted alkoxy, cycloalkyl and substituted cycloalkyl; said substituents on said substituted members selected from the group consisting of nitro, chloro, fluoro, acetoxy, acetamide, phenyl, benzyl, alkyl, alkoxy and cycloalkyl; said alkyl and alkoxy having from one to nine carbon atoms and said cycloalkyl having from 3 to 8 carbon atoms;

wherein [A] is free of reactive carbon-to-carbon unsaturation; free of highly water-sensitive members; and is a polyvalent chemically compatible member of the group consisting of carbonate, carboxylate, carbonyl, ether, silane, silicate, phosphonate, phosphite, phosphate, alkyl and substituted alkyl, cycloalkyl and substitute cycloalkyl, aryl and substituted aryl, urethane and substituted urethane, urea and substituted urea, amine and substituted amine, amide and substituted amide, hydroxyl, heterocyclic carbon containing radical, and mixtures thereof; said substituents on said members being defined above, said component having a molecular weight in the range from about 64 to 20,000; and a viscosity in the range from essentially 0 to 20 million centipoises at 70° C.;

B. a polythiol component having a molecular weight in the range from about 50 to about 20,000 of the general formula:

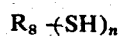

wherein $R_8$ is a polyvalent organic moiety free from reactive carbon-to-carbon unsaturation and n is at least 2, the sum of $m$ and $n$ being greater than 4, with the polyene/polythiol mole ratio being selected so as to provide a solid, self-supporting cured product, and thereafter II. Exposing the mixture to high energy bombardment selected from the group consisting of high energy radiation having a wavelength shorter than about 2,000 A, and nuclear particles derived from radioactive isotopes.

21. The solid product prepared by the process of claim 20.

22. The process of claim 20 wherein high energy bombardment is energetic electrons derived from strontium-90 or from intense electron beams produced by particle accelerators.

23. The process of claim 20 wherein high energy

24. The process of claim 20 wherein high energy bombardment is selected from the group consisting of alpha particles, neutrons, and protons.

25. The process of claim 20 wherein high energy bombardment is with gamma radiation.

26. An article comprising the composition of claim 20 as a coating on a substrate.

27. An article comprising the composition of claim 20 as an adhesive between two substrates.

28. An article comprising the composition of claim 28 as an elastomeric sealant.

29. A shaped, molded article cast from the composition of claim 20.

* * * * *